United States Patent [19]
Bird

[11] Patent Number: 5,323,489
[45] Date of Patent: Jun. 21, 1994

[54] METHOD AND APPARATUS EMPLOYING LOOKAHEAD TO REDUCE MEMORY BANK CONTENTION FOR DECOUPLED OPERAND REFERENCES

[76] Inventor: Peter L. Bird, 42285 Sunnydale La., Northville, Mich. 48167

[21] Appl. No.: 792,241

[22] Filed: Nov. 14, 1991

[51] Int. Cl.⁵ .................................. G06F 13/14
[52] U.S. Cl. ........................ 395/425; 364/DIG. 1; 364/238.6; 364/261.7
[58] Field of Search ... 364/200 MS File, 900 MS File; 395/400, 425

[56] References Cited

U.S. PATENT DOCUMENTS

| | | | |
|---|---|---|---|
| 4,151,598 | 4/1979 | Webster | 395/425 |
| 4,200,927 | 4/1980 | Hughes et al. | 395/375 |
| 4,558,429 | 12/1985 | Barton et al. | 395/425 |
| 4,761,731 | 8/1988 | Webb | 395/425 |
| 4,894,772 | 6/1990 | Langendorf | 395/375 |
| 5,040,107 | 8/1991 | Duxbury et al. | 395/375 |
| 5,050,076 | 9/1991 | Misaka | 395/375 |
| 5,099,419 | 3/1992 | Norura | 395/375 |

*Primary Examiner*—Joseph L. Dixon
*Assistant Examiner*—Hiep T. Nguyen
*Attorney, Agent, or Firm*—Dykema Gossett

[57] ABSTRACT

A data storage system for interleaved memory banks employs a lookahead search of data request addresses to reduce the impact of bank collisions. The system permits out of order load and store referencing patterns. Status of the memory systems individual banks is maintained by a scoreboard which contains the instantaneous status of each memory bank, and a pipeline which contains upcoming transitions of banks from the active to the inactive state. Out of order operations is achieved by selecting the oldest operand reference whose banks are not currently active. Reordering of elements is achieved by assigning a sequence number to each operand reference as it becomes available.

12 Claims, 8 Drawing Sheets

| Banks | Lookahead | | | | | | | |
|---|---|---|---|---|---|---|---|---|
| | 0 | 1 | 2 | 3 | 4 | 5 | 6 | 7 |
| 8 | 40.05 | 53.43 | 61.73 | 67.83 | 72.55 | 75.95 | 78.62 | 80.46 |
| 16 | 52.1 | 71.67 | 82.66 | 89.6 | 93.46 | 95.29 | 95.94 | 96.06 |
| 32 | 65.93 | 86.29 | 95.21 | 97.71 | 98.09 | 98.14 | 98.14 | 98.14 |

FIG. 5

| Banks | Lookahead | | | | | | | |
|---|---|---|---|---|---|---|---|---|
| | 0 | 1 | 2 | 3 | 4 | 5 | 6 | 7 |
| 8 | 2.78 | 3.7 | 4.27 | 4.69 | 5.01 | 5.24 | 5.42 | 5.55 |
| 16 | 3.61 | 4.95 | 5.7 | 6.17 | 6.43 | 6.55 | 6.6 | 6.6 |
| 32 | 4.56 | 5.94 | 6.55 | 6.71 | 6.74 | 6.74 | 6.74 | 6.74 |

FIG. 6

| Lookahead | Banks | Starting Bank Locations ( X, Y, ZX ) | | | | | |
|---|---|---|---|---|---|---|---|
| | | (0,0,0) | (0,11,0) | (15,11,0) | (15,12,0) | (17,14,0) |
| 0 | 8 | 63.23 | 56.31 | 56.31 | 62.38 | 98.64 |
| 1 | | 98.64 | 95.14 | 98.64 | 98.64 | 98.64 |
| 2 | | 98.64 | 98.64 | 98.64 | 98.64 | 98.64 |
| 0 | 16 | 67.96 | 56.68 | 56.68 | 62.84 | 99.80 |
| 1 | | 99.61 | 99.03 | 99.03 | 99.22 | 99.80 |
| 2 | | 99.61 | 99.03 | 99.03 | 99.22 | 99.80 |
| 0 | 32 | 99.61 | 56.68 | 56.68 | 62.84 | 99.80 |
| 1 | | 99.61 | 99.03 | 99.03 | 99.22 | 99.80 |
| 2 | | 99.61 | 99.03 | 99.03 | 99.22 | 99.80 |

FIG. 7

| Lookahead | Banks | Starting Bank Locations ( X, Y, ZX ) | | | | | |
|---|---|---|---|---|---|---|---|
| | | (0,0,0) | (0,11,0) | (15,11,0) | (15,12,0) | (17,14,0) |
| 0 | 8 | 98.64 | 55.51 | 47.0 | 43.92 | 98.64 |
| 1 | | 98.64 | 64.11 | 66.36 | 98.64 | 98.64 |
| 2 | | 98.64 | 98.64 | 98.64 | 98.64 | 98.64 |
| 0 | 16 | 99.61 | 55.87 | 47.26 | 44.15 | 74.74 |
| 1 | | 99.61 | 64.27 | 64.84 | 99.22 | 99.80 |
| 2 | | 99.61 | 99.03 | 99.03 | 99.22 | 99.80 |
| 0 | 32 | 99.61 | 55.87 | 47.26 | 44.15 | 74.74 |
| 1 | | 99.61 | 99.03 | 64.84 | 99.22 | 99.80 |
| 2 | | 99.61 | 99.03 | 99.03 | 99.22 | 99.80 |

FIG. 8

METHOD AND APPARATUS EMPLOYING LOOKAHEAD TO REDUCE MEMORY BANK CONTENTION FOR DECOUPLED OPERAND REFERENCES

TECHNICAL FIELD

The present invention broadly relates to data storage systems for computers, and deals more particularly with a data storage system which re-orders operand references in a multiple data bank system in a manner which virtually eliminates bank collisions and maximizes utilization of memory banks.

BACKGROUND OF THE INVENTION

High performance computers require both fast CPUs and high bandwidth storage sub-systems. A high performance CPU design is achieved by using a combination of device technology and a highly pipelined machine organization. Better device technology permits higher circuit density and shorter gate propagation delays. 'Pipelining' allows an architect to partition machine functionality into a set of short, sequential activities. By keeping each activity small, the architect can minimize the number of gates required for an action and thus keep the fundamental machine cycle time short.

Continual reductions in machine cycle times have aggravated the disparity between the CPU speed and the bandwidth capability of the storage sub-system. While some aspects of operand referencing can be pipelined (e.g. delivering addresses to storage or retrieving values from storage), the actual reference to storage cell is not pipelined. Because each storage cell request requires several machine cycler, to complete, storage sub-systems generally run far slower than the CPU.

There are two common methods that are employed to increase the bandwidth capability of the storage sub-system: caches and interleaved memory banks. A cache is a small, high speed memory positioned close to the CPU. The small size of the cache permits operand referencing in a single machine cycle. A machine's cache structure can be hierarchically organized, where more distant caches are larger but slower. Hierarchical memory organization provides a tradeoff between low latency and large storage capability. A cache can be of limited utility for programs iterating over very large data structures (as might be encountered during vector processing). If an operand is used only once (or the times between uses are far apart), loading it through a cache will unnecessarily displace another operand which may be subsequently used; this is referred to in the art as cache pollution. Clearly this has a negative effect upon performance.

A second implementation strategy increasing a storage system's bandwidth is to partition the address space into 'N' independent banks each of which can be concurrently accessed. This has the potential for a speedup on the order of:

$$\min(\text{bankCycleTime}, \text{bankcount})$$

where the bank cycle time is an integral multiple of the cycle time for the CPU. This speedup can generally be achieved only in special cases where the striding pattern of an operand request is coprime with the interleave factor of the storage system. All other instances cause delays in referencing due to bank conflicts. A bank conflict (or hazard) occurs when 2 operands reference the same memory bank with the bank cycle time of the storage system. When this happens, the second operand must be delayed until the first request has completed.

It would at first appear desirable to maximize the interleave factor. However, hardware implementation problems prohibit this approach. While a high interleave factor might provide better throughput, the engineering problems for implementation also increase. Consider, for example, the fan-in and fan-out of addresses and data from the CPU to the banks. Doubling the interleave factor also doubles the number of wires required for interconnect. With 32 (or more) address bits and 64 data bits, board interconnection rapidly becomes unmanageable.

Substantial effort has been devoted in the past to interleaved memory organizations incorporating bank bypass circuitry, and bank remapping schemes. An early high performance machine which employed an interleaved bank system was the IBM 360/91. As a complement to the scoreboarding system in the CPU, operand references were assigned target register numbers which accompanied them through their traversal of the storage system.

The storage system for the IBM 360/91 provided a mechanism for short circuit passthrough of FLOW and INPUT operand dependencies. When the storage system dynamically detected these dependency relationships it would write multiple copies of the data value into difference registers in the CPU. The target register for the dependent operand would be updated without requiring a read from the storage cell.

Some of the recent work associated with interleaved bank implementations has concentrated upon deriving methods for remapping address streams into pseudo-random bank reference streams. In these schemes, bijective functions which permute the address space are used to remap operand addresses. When applied to constant striding array references, the result is a nearly uniform distribution of bank references. The work presented in this paper complements these pseudo-random memory referencing strategies.

One strategy for reducing bank conflicts is to include a small address buffer at the front of each bank. This implementation has been employed in one simulation study of a bank remapping scheme. The use of bank buffers complicates the synchronization requirements for address and operand transfers within the storage system.

It is interesting to note the role of address decoupling in operand referencing. As shown below, DAE machines use an asynchronous processor to generate addresses for operand references. Data loaded from storage is buffered in a queue in the CPU. Queue references in the CPU are interleaved with other computations. The combination of these properties helps to reduce the instantaneous bandwidth demands on the machine's storage system. Note that a vector load is the degenerate case of address decoupling where the number of operands referenced is a fix length (the size of the vector registers) and the referencing pattern has a fixed stride.

Decoupled address references can cause degradation of performance because of pathological interactions between streams. One study showed through simulation and empirical studies that performance on a range of Cray XMPs[4] could degrade by as much as a factor of 2 because of pairwise interactions between vector loads with specific strides and specific starting bank locations. We experienced a similar effect; this is discussed hereinbelow.

BRIEF DESCRIPTION OF THE DRAWINGS

In the drawings, which form an integral part of the specification and are to be read in conjunction therewith, and in which like reference numerals are employed to designate identical features in the various views:

FIG. 5 is a table showing average floating point efficiency across all of the vector strides;

FIG. 6 is a table depicting the average number of concurrent references for all vector strides;

FIG. 7 is a table showing floating point processor efficiency for differing starting banks for hydro fragment using load priority; and FIG. 8 is a table showing floating point processor efficiency for different starting banks for hydro fragment using store priority;

SUMMARY OF THE INVENTION

The present invention involves a storage system architecture which looks down the address stream in search of an operand request to an inactive bank. A significantly better memory system bankwidth can be realized by modestly increasing the depth of the lookahead. Since a lookahead controller is far less costly to implement than increasing the interleave factor, a lookahead scheme provides an attractive alternative for high-throughput memory system.

According to one aspect of the invention, a data storage subsystem for use in a decoupled computer system includes a plurality of independent, interleaved memory banks, means for receiving and queuing multiple address requests issued by one or more of address request sources, data storage means for storing data representing the activity status of each of the memory banks and means for selecting the oldest addressed request queued in the receiving and queuing means, using the data stored in the data storing means.

According to another aspect of the invention, a method is provided for reducing bank collisions in an interleaved data bank memory system of the type including a plurality of separately addressable memory banks which are interleaved in a manner to allow concurrent access of operand references from the banks using a plurality of queued data request addresses, wherein the bank collisions result from multiple concurrent address requests for the same memory bank. The method includes the steps of receiving multiple queued addresses from one or more sources for subsequent, concurrent processing, performing a lookahead search of the queue request addresses to identify at least one of the addresses which is directed to one of the memory banks are not currently being actively addressed, selecting the request address whose banks is not currently being addressed, and sending the selected request address to its associated bank, thereby resulting in concurrently active banks.

DETAILED DESCRIPTION OF THE PREFERRED EMBODIMENT OF THE INVENTION

Figure 1:
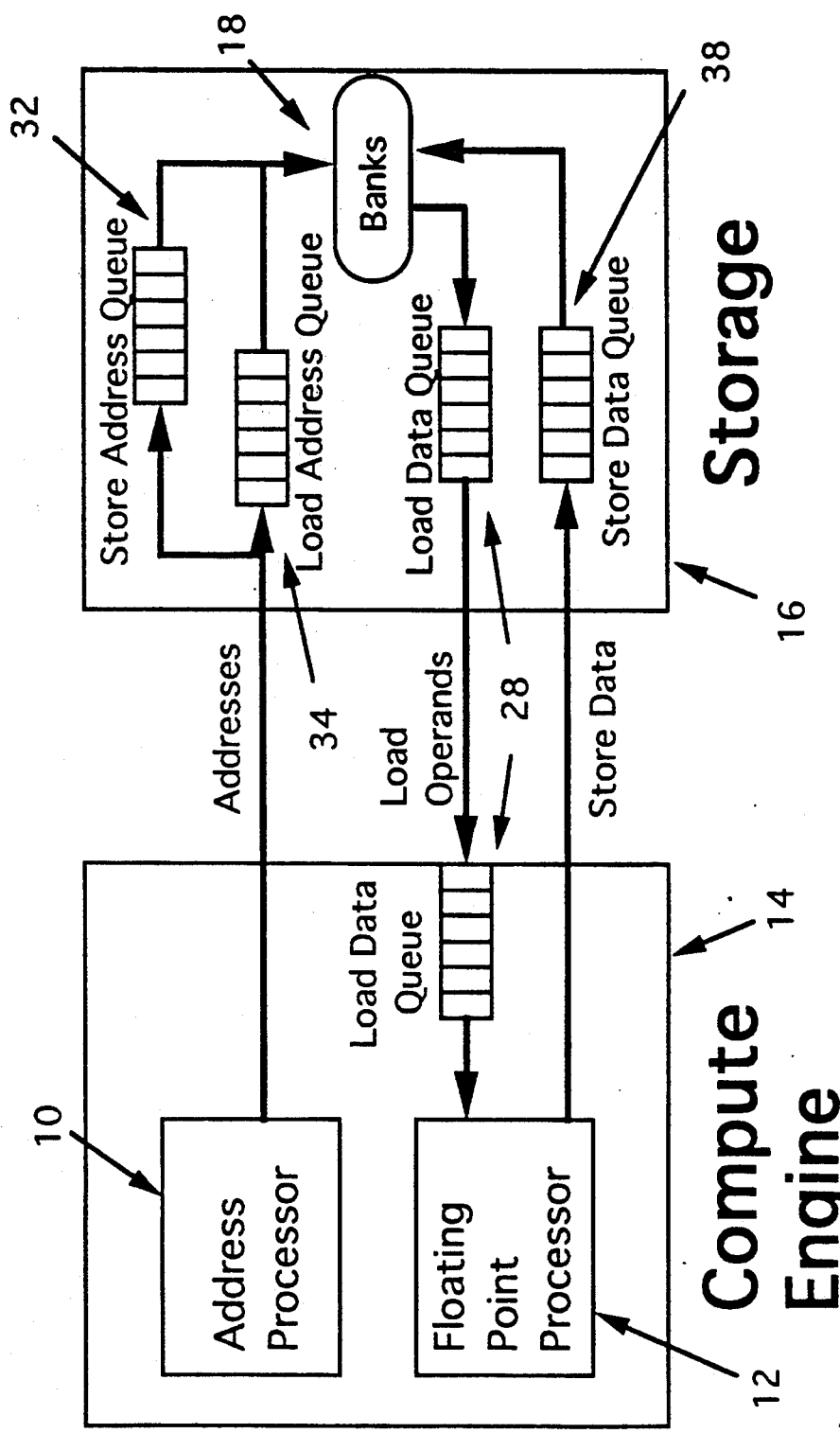
FIG. 1 is a simplified block diagram of a decoupled access/execute architecture suitable for use with the present invention.

The present invention relates to a high performance storage sub-system for a decoupled access/execute architecture (DAE). A simplified block diagram of a DAE system is shown in FIG. 1. In this embodiment, the programs for address generation and arithmetic execution execute on asynchronous parallel processors 10, 12 comprising the CPU 14. The address generator computes a stream of load and store operand references for the storage sub-system 16. These addresses are queued within the storage sub-system 16 on the load address queue (LAQ) and the store address queue (SAQ). The addresses are used to activate the interleaved banks 18.

Load data migrate from the banks 18 onto a load data queue (LDQ) where they are held pending the load request by the CPU 14. The floating point processor 12 also contains a local LDQ; this is required to reduce the impact of latency of transfers between the CPU and the storage sub-system 16.

Store addresses are held in the storage sub-system 16 until their associated store datum is passed from the CPU 14. At that time, the store address is used to activate the appropriate bank 18, and the store datum is moved from the store data queue (SDQ) to the banks 18.

THe above described system requires programs to exhibit strictly sequential semantics for correct execution. This means that load and store operand addresses must be sent to the storage sub-system 16 in the same order they occur in the sequential dynamic semantics of the source program. The program fragment $$a = b + c$$

$$d = e \times f$$

must necessarily generate the following address request stream:

1. load b
2. load c
3. store a
4. load e
5. load f
6. store d

The adherence to sequential semantics is essential for maintaining data dependency relationships. The proper processing of dependencies requires that store requests must be buffered in the storage system 16. Since the system can maintain many pending store requests, subsequent load requests can be checked for FLOW dependency relationships against all pending store addresses.

It is also necessary to maintain load/store relationships in the presence of ANTI dependences. Consider the following code sequence:

$$A = \ldots$$
$$= \ldots A \ldots$$
$$A = \ldots$$

The load for 'A' must be processed before the second store of 'A'. If the system ignores this situation and moves the second store onto the store address queue, then a deadlock condition might arise in the machine. A naive check for FLOW dependencies would cause the load to wait for the second store. In this case, the machine will halt since the second store requires that the statement containing the load be executed.

The solution employed by the present inventive system to prevent this kind of deadlock is to block the input address stream whenever a FLOW dependency relationship is encountered. Blocking the input stream upon FLOW dependencies, and the fundamental synchronization of DAE machines implies that no further check for ANTI dependences is required.

Figure 2:
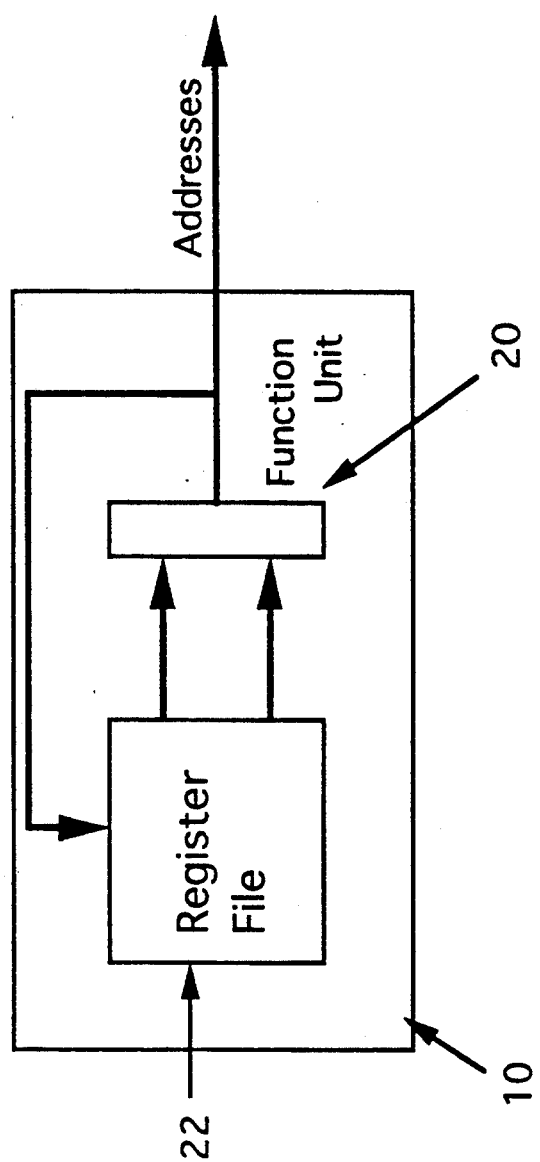
FIG. 2 is a simplified block diagram of the address processor forming part of the architecture shown in FIG. 1.
Figure 3:
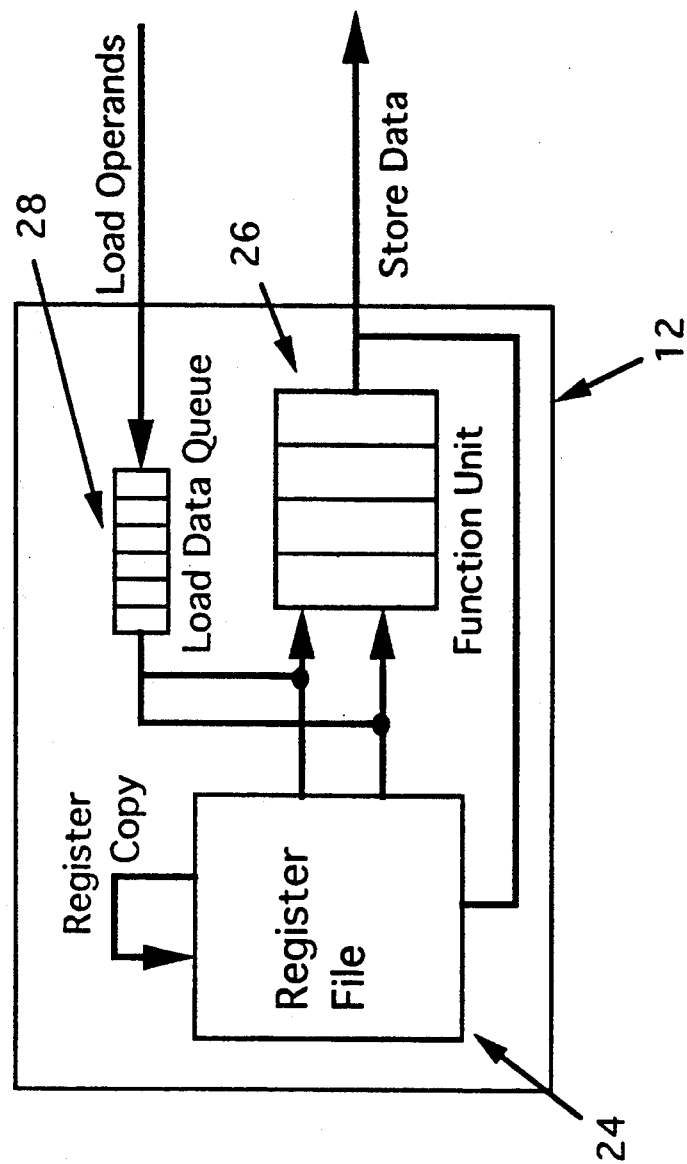
FIG. 3 is a simplified block diagram of the floating point processor forming part of the architecture shown in FIG. 1.

Referring now particularly to FIGS. 2 and 3, the compute engine (CPU) 14 of the system is composed of two asynchronous processors: an address processor (AP) 10 and a floating-point processor (FP) 12. The AP 10 consists of an integer function unit 20 (capable of addition and multiplication) and a 3-port register file 22. AP 10 operations are assumed to take a single cycle to complete. A path (not shown) to memory for the AP would also normally be employed.

The floating point processor (FP) 12 consists of a 3-ported register file 24, a 5-stage pipelined function unit 26 and a local load data queue (LDQ) 28. The instruction set for the FP 12 allows a result to be written to the data memory in parallel with its write to the FP register file 24. The FP instruction set supports a parallel register-copy operation.

Figure 4:
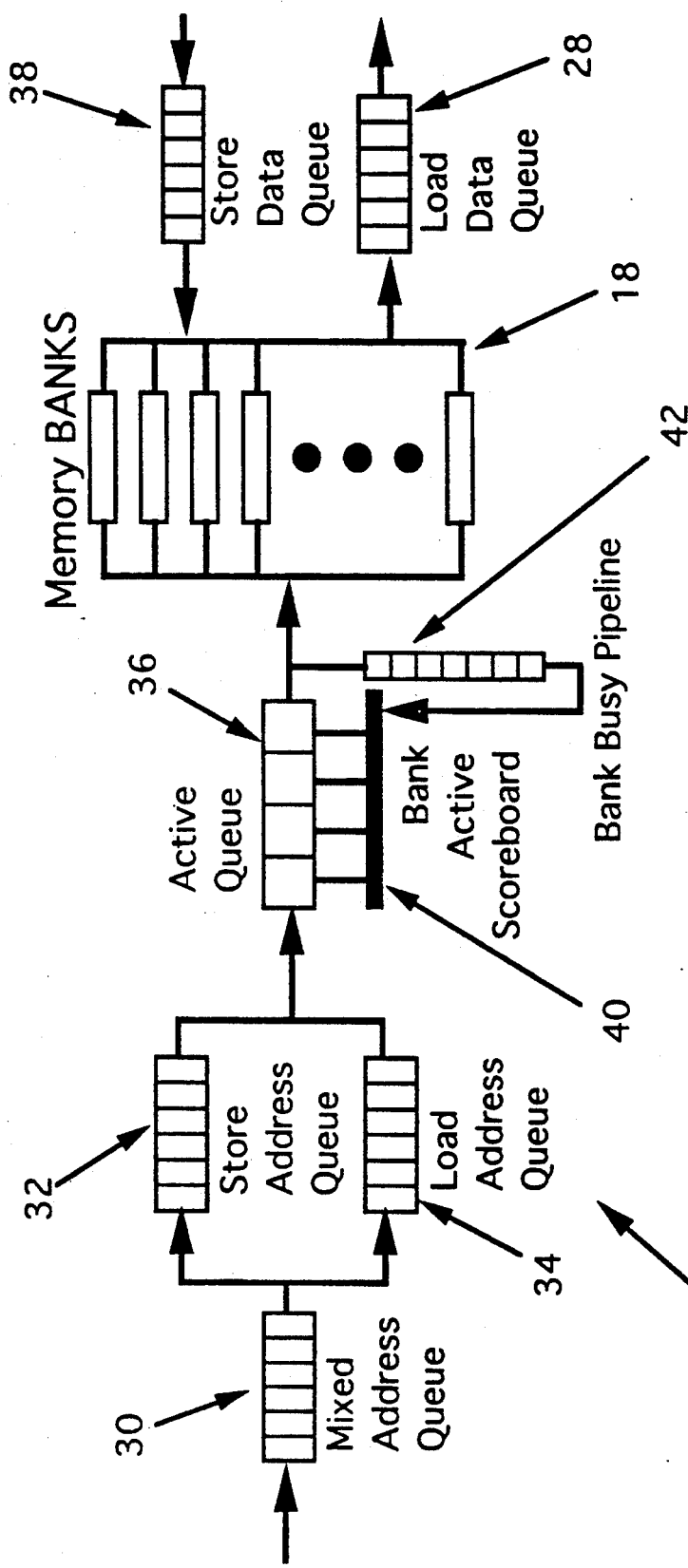
FIG. 4 is a simplified block diagram of the storage subsystem forming part of the architecture of FIG. 1.

A block diagram of the storage sub-system 16 is shown in FIG. 4. The storage system 16 is composed of a set of address and data queues, a scoreboard, a pipeline, and a collection of interleaved memory banks.

The mixed address queue (MAQ) 30 is used to buffer addresses received from the AP 10. Addresses at the front of the MAQ 30 are moved to the Store Address Queue (SAQ) 32 and the Load Address Queue (LAQ) 34.

Store addresses at the front of the MAQ 30 are moved onto the SAQ 32 whenever the SAQ 32 is not full.

A Load address at the front of the MAQ 30 is moved onto the LAQ 34 only after it is first checked for FLOW dependency relationships. This is done by checking the "pending" load address against all addresses on the SAQ 32. If all comparisons fail, the load address is transferred to the LAQ 34. If a match is detected, however, then a FLOW dependency relationship exists. The load address is block at the front of the MAQ 30, and all subsequent memory references are delayed behind the dependent load. As mentioned previously, this policy resolves both FLOW and ANTI Dependencies.

Addresses on the SAQ 32 and the LAQ 34 are moved to the Active Queue (ActQ) 36 under the following conditions:

(1) Load addresses can be moved from the LAQ 34 to the ActQ 36 when neither the ActQ 36 nor the load data queue (LDQ) 34 are full.
(2) Store addresses can be moved from the SAQ 32 to the ActQ 36 when the ActQ 36 is not full, and an associated store datum is available in the store data queue (SDQ) 38.

Since either queue could deliver an address to the ActQ 36 on a given cycle, it was necessary to establish a priority for these transfers. DAE simulations have been successfully run using two policies governing transfers to the ActQ 36: prioritizing loads and prioritizing stores; results are discussed hereinbelow.

When an operand request is moved to the ActQ 36, it is assigned a sequence number. The sequence number represents the position of the operand in the stream of load (or store) references. The sequence number is used as the location in the LDQ 28 or SDQ 38 where the operand value is to be written to (or read from). Counters implementing sequence numbers are incremented (modulo queue size) with every operand moved to the ActQ 36. Sequence numbering provides a simple means of recovering the sequential semantics of operand fetching with a minimum of additional data structure.

The Active Queue 36, along with the Bank Active Scoreboard (BAS) provides the 'look ahead' search capability for the system. An active bank has its bit set in the BAS 40; an inactive bank has its bit cleared in the BAS 40. The BAS 40 maintains the present state of activity of the system's banks 18.

To perform the 'look ahead' search, the bank numbers for all addresses in the ActQ 36 are checked (in parallel) against the bank state in the BAS 40. The oldest operand reference in the ActQ 36 whose bank is not currently active is selected for memory referencing. The selection of the oldest operand both preserves the sequential semantics of a program and insures fairness in operand activation.

The depth of the active queue (ActQ) is the lookahead value for the system. When an operand request is removed from the ActQ 36, the bank active scoreboard (BAS) 40 is set to reflect the busy bank of the activated reference. The address for the selected operand request is sent to the appropriate bank 18; and the bank number for the reference is appended to the bank busy pipeline (BBP) 42.

An operand reference to a memory bank takes several machine cycles to complete; this value is defined herein as the bank cycle time. The length of the BBP 42 is the same as the bank cycle time. Since the BBP 42 is advanced each machine cycle, when the bank number for an operand reference reaches the front of the BBP 42, the bank will have completed operand processing. At this time, the bank active scoreboard (BAS) 40 is cleared, and the sequence number of the load reference is used for the target register in the load data queue for the operand.

The BBP 42 maintains the dynamic stage of activity of the memory banks. The different stages of the pipeline contain the numbers for active banks. Their distance from the front of the BBP 42 is a count of the number of cycles before the bank becomes available for subsequent usage.

The mechanisms described above present operand references to the memory banks in an 'out of order' sequence yet maintain dependency relationships. The sequence numbers re-order the references for correct usage in the FP 12.

While the LDQ 28 is randomly written using sequence numbers, it must be dequeued from the 'front' when data is transferred to the FP 12. The dequeue operation is controlled by a data queue scoreboard which determines if the cell at the 'front' of the queue has been written to by the banks. When a datum is written into the LDQ 28 the scoreboard is set. A dequeue operation will clear the scoreboard. A similar scoreboard manages en queue operations for the SDQ 38 by the CPU 14.

It is important to note that the control of the memory banks 18 is completely centralized and fully deterministic. The state of bank activity is entirely contained in the bank active scoreboard (BAS) 40 and the bank busy pipeline (BBP) 42. The centralization of the machine state provides for a fully deterministic control of the memory banks 18 thus eliminating the need for synchronization handshakes between the memory controller and the banks and between the banks and the data queues.

The implementation of lookahead described above provides the mechanism required for "out-of-order" loading and storing of operands. Its implementation requires only a set of comparators on the SAQ 32 for the FLOW dependency checks, and a very simple scoreboard for determining which banks are active. A lookahead controller is significantly less difficult to implement than an alternative, distributed mechanism for "out-of-order" accesses: independent bank queues.

A memory sub-system designed for high-throughput can be organized with queues at the front of each independent memory bank. The problems associated with distributing addresses and re-sequencing data make this strategy more complicated and less desirable than implementing lookahead.

A simulation model of the storage system described above has been constructed. Rather than construct complete models for the AP and FP, 'scripts' were employed to represent the dynamic behavior of these processors while executing a program fragment.

Two distinct sets of experiments were performed. The first set performed simple vector loads using a vector of length 1000 and strides of 1 through 8. The AP script for this consisted of the string of 1000 addresses. The FP script was 1000 dequeue requests for its load data queue (LDQ).

To reduce the number of trials for experiments, several storage system parameters were fixed. The length of all address queues (MAQ, LAQ and SAQ) were set to 16. The length of the data queues (LDQ and SDQ) were fixed at 32. It was assumed that the cost of a memory bank reference was 7 machine cycles.

To create a realistic machine model, we included a 1 cycle latency cost was included in queue to queue transfers. This represents the overhead for the control synchronization and the data transfers between queues. Thus, the path:

AP→MAQ→LAQ→ActQ→BANK→LDQ→FP requires '1+1+1+1+7+1+1=13' machine cycles in an empty storage system. Full and Empty control signals between the CPU and the storage system were also assumed to have a latency.

An effective co-routine mechanism was developed by preparing "scripts" of program behavior for the AP and the FP sub-machines. These scripts were built during a presimulation phase and written to two distinct files. During simulation, the files were read by the appropriate processor.

The script for the AP consisted of the sequence of operand addresses used in the course of the computation, coupled with an indication of whether the reference was a Load or Store. For some simulations, the addresses had their bank numbers remapped.

The script for the FP reflected tlie Load/Store requirements of this processor on a per-cycle basis. If the resources were not available (such as insufficient Load operands), the script was frozen and the 'instruction' continually executed until the resource became available. Cycles which did not require Load operands (where the values were expected to be retrieved from registers) were retained in the script. These scripts capture the temporal requirement behavior of programs without requiring a full functional simulation.

Vector loads seems to provide a reasonable initial determinant of memory performance. However, a simple load stream is not a very effective measure. If the stride of the array stream is coprime with the number of banks in the system, then vector references will cycle through all banks of the system and memory performance will be good. If the stride is not coprime, only some of the banks in the memory will be referenced. If the number of banks references is less than the bank cycle time, then hazards will necessarily exist.

To eliminate the impact of striding, a simple, bijective bank remapping function was used to transform operand addresses. As mentioned in Section 2, use of such a transformation on the address stream results in a uniform distribution of bank conflicts in the memory subsystem. To create this function, a lookup table was seeded with tuples of random numbers and an incrementing index, and then the table was sorted according to the random numbers. The reordered index was used to replace the low order 12 bits of an operand's address field; this permuted the low order bits of the address. The scheme was not intended to be optimal. It was only intended to reduce the impact of strides when processing vector addresses.

Of primary interest were two characteristics of our model: FP Efficiency and the number of concurrent references to banks. "FP efficiency" was defined as $$\frac{\text{number of instructions}}{\text{number of cycles}}$$

In the case of a vector load, the number of instructions is exactly the length of the vector. The number of cycles is the time between the arrival of the first operand and the last operand in the FP; the 'cold start' and 'shut down' costs of vector processing have been deducted from the cycle count for all trials. Given simple vector loads, this definition of efficiency is a good measure of memory throughput.

'Concurrent References' is defined as the average number of concurrent references in the machine's memory. This is the average number of concurrently active banks. To reduce the impact of 'cold start' and 'shut down', the memory box was sampled only when at least 1 address was resident on any of the MAQ, LAQ, SAQ or ActQ. This provides a measure of bank utilization which is unrelated to the latency costs between the CPU and the data memory.

The experiments consisted of loading 1000 element vectors, using strides of 1 through 8, on 8, 16 and 32 bank systems using lookahead(0) though lookahead(7). The average FP performance across all strides is shown in the table of FIG. 5. The data for the average number of 'concurrent accesses' is shown in the table of FIG. 6.

The data in the tables of FIGS. 5 and 6 show that even a modest degree of lookahead is useful. Lookahead(1) provides between 13% and 20% improvement in machine performance over lookahead(0) across all strides and bank configurations. FIG. 5 shows that lookahead(1) provides performance which is at least as good as doubling the number of banks and using lookahead(0). Lookahead(4) provides more than 30% improvement in system performance over lookahead(0). It is interesting here to note than an 8 bank system with lookahead(3) outperforms a 32 bank system without lookahead.

FIG. 5 demonstrates that bank remapping strategies will benefit greatly from lookahead. The column for lookahead(0) represents a remapped address stream without the advantage of lookahead. Simulations employing lookahead demonstrate significant performance increases over simple bank remapping.

Given 16 and 32 bank systems, FP efficiency nearly converges around lookahead(6). The average difference in efficiency between the two bank configurations at lookahead(6) is 2.2%. Since the fan-in and fan-out costs double with each increase in the bank interleave factor, the table of FIG. 5 argues strongly for minimizing the interleave factor by implementing lookahead.

Simulations of vector loads highlight the performance capabilities of lookahead, but they cannot depict the significance of lookahead in a decoupled access-/execute architecture.

Vector machines cluster their load (or store) requests into sets of single instructions. Unless the machine supports chaining, the CPU is idled while the load request is satisfied. In addition to creating instantaneous 'stresses' of the memory system, vector instruction sets create hardships for compiler writers by requiring both the effective reuse of vectors for good performance, and complex transformations to map a program's semantics into sets of vector operations.

A DAE machine partitions a program into address requests and floating point operations; in the disclosed embodiment, these sub-programs run on different, asynchronous processors. As discussed above, the FP communicates with memory via queues. Because operand requests (via LDQ dequeuing) are interleaved with computations, a DAE machine is better able to utilize memory than a vector machine. This means that peak memory bandwidth is not the most important criteria in determining a DAE system's capability. In the final measure, it is the number of cycles the FP takes to complete a computation which is the most important characteristic of the storage system.

As with the above described vector load simulation, a measurement was made of the number of cycles the FP was stalled waiting for the delivery of a load datum from the storage system. Efficiency was again measured as $$\frac{\text{instructions}}{\text{cycles}}$$

However, not included was the cost of control operations in the statistics; it was assumed all control instructions take 0 time. Excluding control instructions creates more stringent conditions for efficiency, since the storage system is no longer able to deliver operands during otherwise idle control cycles.

Addresses for this set of experiments were not remapped. The address traces reflect the striding behavior of the array references.

It was assumed that the inner loops of programs were loop pipelined. This scheduling technique insures that the function units of the processor are saturated. This provides for a more stringent requirement for efficiency from the memory model.

Hydro fragment was studied because it is simple to understand, and yet it presented a rather interesting range of results depending upon the starting bank addresses of the operand arrays used. The code for hydro fragment is a follows:

DO k=1, n
x[k]=q+y[k]x (r x zx[k+10]+t x zx[k+11])
ENDDO

The body of the loop has 3 storage references: x[k],y[k] and zx[k+11]. The scalars in the loop ('q', 'r' and 't') can be loaded before loop execution. The value 'zx[(d+10)' is a loop carried INPUT dependence; it can be copied from the previous iteration's value of 'zx[k+11]'.

Given these 3 arrays, there are $N^3$ different ways that they can be positioned on starting banks in a 'N' bank system. We found that poor positioning of the starting bank location can result in pathological, and sometimes counter intuitive, results (as discussed below).

The tables of FIGS. 7 and 8 respectively contain performance data for specific instances of hydro fragment for different storage priority policies. FIG. 7 shows the performance if loads have priority over stores. FIG. 8 presents the same simulations run with a store priority.

The columns of these tables represent the starting bank locations for the three different arrays used in the loops. For example, column '(0,0,0)' represents the performance execution of the program when all arrays are allocated to begin in bank '0'.

By examining the body of hydro fragment, it should be clear that if 'y' and 'zx' are offset by 11 banks, then every iteration of the loop will create a bank conflict with these operand references. This condition is depicted in column '(0,11,0)' of Tables 3 and 4. With an N bank system, there are $N^2$ different ways to allocate 'y' and 'zx' so as to create this conflict. Note that increasing the interleave factor for the memory system does nothing to aid in the performance regardless of the priority policy.

It has been found that employing a strict load priority required deeper address and data queue depths. Simulation trials were also run with a store priority policy to determine differences in performance. Under a store priority policy, a store address was moved from the SAQ to the ActQ whenever a matching store datum was available on the SDQ. Although the address and data queue lengths were better, for lower values of lookahead most simulation runs displayed lower performance (except in a single instance: '(0,0,0)'). By lookahead(2) performance converged, the impact of the storage priority was eliminated.

It was found that a counter intuitive result using the store priority policy for lookahead(0); doubling the number of banks in the memory actually reduced performance in some instances. Consider the last column of table of FIG. 8. When the interleave factor was increased, the performance was degraded by almost 24%. This occurred because of a pathological orientation of the load and store addresses.

Recall that store addresses are removed from the address stream and held on the SAQ until the store datum is delivered to the memory. This schema provides the same effect as having independent load and store address streams. The relative relationship of the processing of these streams is established by the priority policy and the incidence of bank hazards. Given 8 and 16 bank systems, the stream relationships are quite different. For the particular trial '(17,14,0)' on a 16 bank implementation, the load stream had advanced so that the load address following the first store reference onto the ActQ shared the store reference's bank number. This caused a full memory latency delay for the load; all subsequent memory references were blocked. Throughout the remainder of the trial, the relationship of the load/store streams maintained this hazardous condition, hence the reduced performance.

As mentioned earlier, a similar type of counter intuitive behavior was observed on a range of CRAY X-MPS. Memory references for a multiple streams initiated on different banks interacted with the crossbar switch and the active banks to produce rather diverging machine performances. The simulation results were confirmed by execution of a CRAY-XMP48 and a Cray 1-S.

The diverging performance behavior occurred in systems with between 16 and 64 banks and a 4 cycle bank refresh time; these are less constricting conditions that existed for our simulation. This implies that the behavior observed with the interaction of the present load and store streams is likely to be encountered in any memory system which supports streaming requests. Any degree of lookahead removes this performance degradation. Remapping the bank addresses would also eliminate this type of pathological relationship, even with a store priority for the memory system.

In both sets of trials, a modest degree of lookahead completely eliminated the impact of the different starting bank locations, even for pathological cases. This can be seen in the rows for lookahead(2) across all bank configurations. Lookahead provides an essential smoothing factor for all storage layouts. The use of lookahead also eliminated all differences in performance for the two priority schemes (compare the performance for lookahead(0) and lookahead(2)).

The data in FIGS. 7 and 8 shows that a fixed number of runs of any benchmark on a DAE machine cannot adequately provide conclusive results for lookahead(0) systems because of the sparsity of pathological cases. On a 32 bank configuration, the hydro fragment alone has $32^3$ configurations of which a significant subset displays reduced performance.

The dynamic conflicts introduced by poor storage allocation cannot be corrected statically during compilation. Although a compiler can perform a high degree of analysis of array referencing patterns, different loops can reference arrays in different fashions. This significantly complicates the analysis required for optimal positioning, and can even result in conflicting requirements for optimal layout. If the array is positioned on the program's stack, optimal positioning is further complicated. Moreover, the storage allocation policy of the operating system and its loader can also contribute to the problem. The fundamental problem of pathological bank positioning is easily corrected, however, by the incorporation of lookahead in a streaming memory system design.

In summary, the present invention reduces the impact of bank collisions in an interleaved memory system by incorporating a lookahead search of the data request addresses which are buffered in the storage system. Utilizing the present invention, even a modest degree of lookahead can significantly reduce the number of bank collisions encountered during streaming operand requests. Test results show that lookahead is more effective than doubling (and sometimes even quadrupling) the interleave factor of the storage system. The structure of a lookahead controller allows for the centralized, deterministic management of the storage system. This reduces the complexity of synchronization mechanisms and eliminates the need for buffering capabilities at each bank.

While the memory system design of the present invention is useful for vector machine operations, the lookahead search coupled with a DAE architecture can provide effective memory bandwidth with a minimum number of interleaved banks.

From the foregoing, it is apparent that the system described above not only provides for the reliable accomplishment of the objects of the invention but does so in a particularly cost effective and efficient manner. It is recognized, of course, that those skilled in the art may make various modifications or additions to the preferred embodiment chosen to illustrate the invention without departing from the spirit or scope of the present contribution to the art. Accordingly, it is to be understood that the protection sought and to be afforded hereby should be deemed to extend to the subject matter claimed and all equivalents thereof fairly within the scope of the invention.

What is claimed is:

1. A data storage subsystem for use in a decoupled access/execute computer system, comprising:
   a plurality of interleaved memory banks, each of the memory banks being switchable between active and non-active states for a preselected period of time;
   a mixed address queue for receiving and buffering load an store addresses used to address said memory banks;
   a store address queue for receiving store addresses from the mixed address queue when the store address queue is not full;
   a load address queue for receiving one of said load addresses from the mixed address queue when said load address queue is not full and a match is not detected between said one load address and any of the addresses in the store address queue;
   a store data queue for storing datum to be transferred to the interleaved memory banks;
   an active queue for receiving load addresses from the load address queque when the active queue is no full, and for receiving storage addresses from the store address queue when the active queue is not full and an associated store datum is available in the store data queue; and,
   a bank active scoreboard cooperating with the active queue for providing a lookahead search of data request addresses.

2. The data storage subsystem of claim 1, including a bank busy pipeline for selectively clearing the bank active soreboard when one of the banks switches from an active to a non-active state.

3. A data storage subsystem for use in a decoupled computer system of the type including sources issuing multiple address requests, comprising:
   a plurality of independent, interleaved memory banks;
   means for receiving and queuing multiple address requests issued by one or more of said address request sources;
   first data storage means for storing data representing the current activity status of each of said memory banks; and,
   means for selecting, using said data stored in said data storing means, the oldest address request queued in said receiving and queuing means whose bank is not currently active, regardless of the order in which said oldest request was received by said receiving and queuing means.

4. The data storage subsystem of claim 3, including:

second data storage means for storing said data representing transitions of the activity status of the banks between active and inactive states, said second data storage means cooperating with said first data storage means to provide data identifying a bank that has been selected by said selecting means.

5. The data storage subsystem of claim 3, including means for reconstructing the references sequencing ordering of the multiple address requests received and queued by associating sequencing members with the multiple address requests received and queued by said receiving and queuing means.

6. The data storage subsystem of claim 5, including means cooperating with said associating means for resequencing data output from said banks into a sequence corresponding to the order in which said address requests were received by said receiving and queuing means.

7. A method for reducing bank collisions in an interleaved data bank memory system of the type including a plurality of separately addressable memory banks which are interleaved in a manner to allow concurrent access of operand references from said banks using a plurality of queued data request addresses, wherein the bank collisions result from multiple concurrent address requests for the same memory bank, comprising:

(A) receiving multiple queued addresses from one or more sources for parallel bank referencing activity;

(B) performing a lookahead search of said queued request addresses to identify at least one of said addresses which is directed to one of said memory banks not currently being actively addressed;

(C) selecting the request address whose bank is not currently being addressed; and, (D) sending the address selected in step (C) to its associated bank, thereby resulting in concurrently active banks.

8. The method of claim 7, wherein the lookahead search permits out of order load and store referencing patterns.

9. The method of claim 7, wherein the lookahead search includes the step of maintaining the status of the interleaved data banks using a scoreboard containing the instantaneous status of each memory bank.

10. The method of claim 7, wherein the lookahead search includes forming a pipe line containing upcoming transitions of banks from the active to the inactive status.

11. The method of claim 7, wherein the lookahead search includes performing out of order operations by selecting the oldest operand reference whose banks are not currently active.

12. The method of claim 7, wherein the lookahead search includes reordering elements by assigning a sequence number to each operand reference as it becomes available.

* * * * *

UNITED STATES PATENT AND TRADEMARK OFFICE
CERTIFICATE OF CORRECTION

PATENT NO. : 5,323,489

DATED : June 21, 1994

INVENTOR(S) : Peter L. Bird

It is certified that error appears in the above-identified patent and that said Letters Patent is hereby corrected as shown below:

Column 12, Line 31: change "an" to "and"
Column 12, Line 44: change "no" to "not"
Column 12, Line 54: change "soreboard" to "scoreboard"
Column 13, Line 7: delete "said"

Signed and Sealed this

Eleventh Day of October, 1994

Attest:

BRUCE LEHMAN

Attesting Officer

Commissioner of Patents and Trademarks